(12) United States Patent
Dubief et al.

(10) Patent No.: US 11,160,412 B2
(45) Date of Patent: Nov. 2, 2021

(54) BEVERAGE PREPARATION DEVICE

(71) Applicant: NESTEC S.A., Vevey (CH)

(72) Inventors: Flavien Dubief, Champagne (CH); Larry Baudet, Font (CH)

(73) Assignee: Societe des Produits Nestle S.A., Vevey (CH)

( * ) Notice: Subject to any disclaimer, the term of this patent is extended or adjusted under 35 U.S.C. 154(b) by 195 days.

(21) Appl. No.: 16/301,575

(22) PCT Filed: May 1, 2017

(86) PCT No.: PCT/EP2017/060311
§ 371 (c)(1),
(2) Date: Nov. 14, 2018

(87) PCT Pub. No.: WO2017/198444
PCT Pub. Date: Nov. 23, 2017

(65) Prior Publication Data
US 2019/0290052 A1    Sep. 26, 2019

(30) Foreign Application Priority Data

May 17, 2016 (EP) ..................................... 16169857

(51) Int. Cl.
*A47J 31/20* (2006.01)
*A47J 31/40* (2006.01)
*A47J 31/60* (2006.01)

(52) U.S. Cl.
CPC ............. *A47J 31/401* (2013.01); *A47J 31/60* (2013.01)

(58) Field of Classification Search
CPC ...... A47J 31/4403; A47J 31/40; A47J 31/002; A47J 31/0615; A47J 31/22; A47J 31/401; A47J 31/60; A47J 31/00; A23F 5/26; A23F 3/18; A23F 5/24
See application file for complete search history.

(56) References Cited

U.S. PATENT DOCUMENTS

| 1,602,632 | A | * | 10/1926 | Zorn | ....................... | A47J 31/22 |
| | | | | | | 210/210 |
| 6,085,638 | A | * | 7/2000 | Mork | ...................... | A47J 31/22 |
| | | | | | | 392/480 |
| 2010/0018405 | A1 | | 1/2010 | Duvall | | |

FOREIGN PATENT DOCUMENTS

| CN | 101217904 A | 7/2008 |
| CN | 101374442 A | 2/2009 |
| CN | 101600378 A | 12/2009 |
| CN | 101686771 A | 3/2010 |
| CN | 101959446 A | 1/2011 |
| DE | 4240429 | 6/1994 |

(Continued)

*Primary Examiner* — Hong T Yoo
(74) *Attorney, Agent, or Firm* — K&L Gates LLP

(57) ABSTRACT

The invention concerns a beverage preparation device (10), said device comprising:—a chamber (1) for receiving and agitating a liquid, said chamber comprising an opened top (11), an opened bottom (12) and a lateral side wall (13), said chamber presenting the shape of a solid of revolution, the axis of revolution (XX') being oriented between the top and the bottom of the chamber, —a rotating unit (2) for spinning the chamber (1) around its axis of revolution (XX'), and wherein the chamber presents a shape such that when the chamber is spinning, liquid present in the chamber forms a ring of liquid along the lateral side wall (13) of the chamber above the opened bottom (12).

16 Claims, 12 Drawing Sheets

(56) References Cited

FOREIGN PATENT DOCUMENTS

| EP | 0407365 A1 | 1/1991 |
|----|------------|--------|
| FR | 2513103 | 3/1983 |
| WO | 2015173123 | 11/2015 |

* cited by examiner

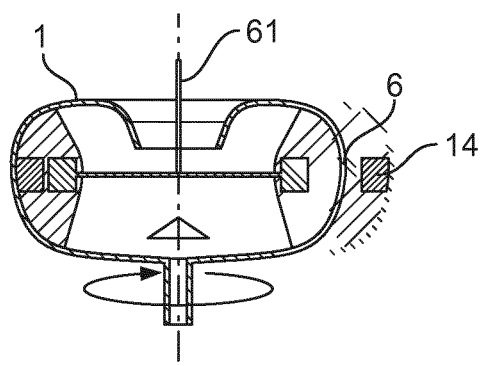
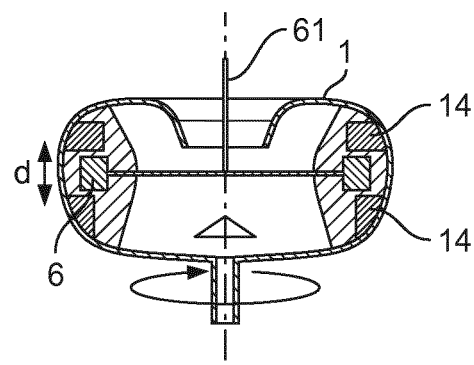
FIG. 11a    FIG. 12a
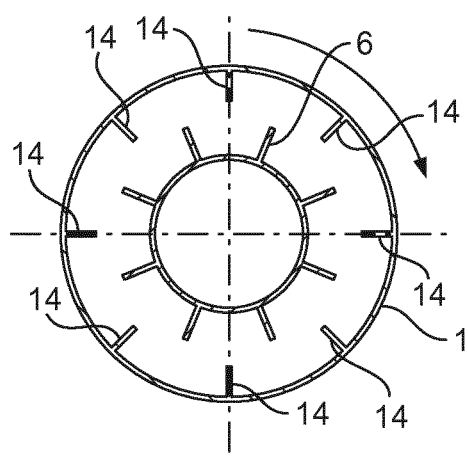
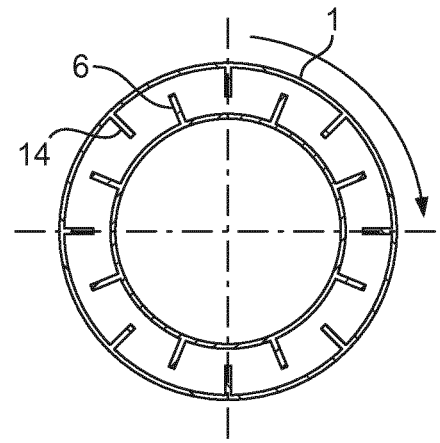
FIG. 11b    FIG. 12b

BEVERAGE PREPARATION DEVICE

CROSS REFERENCE TO RELATED APPLICATIONS

The present application is a National Stage of International Application No. PCT/EP2017/060311, filed on May 1, 2017, which claims priority to European Patent Application No. 16169857.6, filed on May 17, 2016, the entire contents of which are being incorporated herein by reference.

FIELD OF THE INVENTION

The present invention relates to beverage preparation devices preparing beverages in a chamber wherein the beverage is agitated.

BACKGROUND OF THE INVENTION

Many beverages like espresso and other coffee beverages, milk beverages, chocolate beverages are prepared by mixing a beverage soluble powder with a diluent. Other devices are simply used to texturize, generally froth, an existing beverage, for example frothing fresh milk to use it in combination with another beverage component like coffee.

Various mixing and frothing devices are known for speedier preparation of such beverages by mixing the beverage soluble powder with the diluent, such as water, or agitating a liquid like milk.

Some devices comprise a whipping chamber in which the soluble component and the diluent are fed and mixed by a whipper. The beverage is then evacuated into a receptacle for drinking. The inconvenient of whipping chambers is the maintenance. The regular cleaning of the chamber requires the dismounting of the chamber, the dismounting of the whipper from the motor shaft, the dismounting of the gasket that guarantees sealing around the shaft. The operation can be long and fastidious.

Other devices use a magnetic drive to avoid the use of a gasket, but only a limited torque can be transmitted to the whipper. Consequently, depending on the beverage, the dissolution or frothing may not be sufficiently efficient.

Other devices comprise diluent jets that hit a beverage component dosed within a cup or chamber and that provide mixing, dissolving and/or frothing. The inconvenient of these devices is that the mechanical energy created by the jet on the beverage is limited by the volume of the beverage itself. Once all the volume of diluent has been dispensed by the jet it is not possible to agitate the beverage any longer. Accordingly the dissolution or frothing may not be sufficiently efficient.

In US 2003/007061 it has been proposed to solve the cleaning issue of known whipping chambers by implementing a rotary mixing chamber spinning around a vertical axis. Due to the rotation of the chamber itself, the problem of dismounting and cleaning the chamber is improved because the chamber is simply attached to a rotor in a releasable manner; consequently enabling easy removal. Yet, blades are attached fixedly inside the rotating chamber and rotate with the chamber. Consequently, although the chamber is easy to dismantle from the rotor, the cleaning of the interior part of the chamber remains very difficult.

As for beverage preparation, during rotation, these blades move the beverage ingredients together toward the center of the chamber for mixing. Accordingly beverage ingredients falling from the top of the chamber are mixed together while they pass through the mixing blades and then are dispensed through the chamber bottom outlet, while the chamber is still rotating.

While this prior art solves the problem of dismounting the chamber form the device, this mixing chamber does not enable a good control of the mixing of the ingredients. Yet mixing needs to be adapted depending on the nature of the beverage ingredients introduced in the chamber and on the desired attributes of the resulting beverage. In particular this rotating chamber of the prior art does not enable the control of the mixing time within the chamber.

Since ingredients are directed to the middle of the chamber to be mixed by the blades, they are simultaneously falling through gravity and rapidly dispensed through the outlet.

Such a chamber is not adapted for ingredients that may have poor dissolution properties and would require a longer contact between the beverage powder and the diluent.

Such a chamber does not enable the preparation of small volume beverages because it does not enable a sufficient contact between the small volume of diluent and the powder.

Such a chamber does not enable a gentle mixing of a powder and a diluent because if the mixing chamber does not rotate sufficiently high the powder and the diluent directly fall to the chamber outlet. For example, this chamber does not enable the production of a black coffee without froth. Consequently this chamber does not enable the production of various different beverages with or without froth.

An object of the invention is to address at least some of the drawbacks of the prior art beverage preparation devices or at least to provide an alternative thereto.

An object of the present invention is to provide a beverage preparation device enabling the preparation of a variety of different beverages whatever the volume of the liquid used for the beverage preparation.

It would be advantageous to provide a device that is easy to dismantle and to clean once dismantled.

It would be advantageous to provide a device that enables a fine tuning of the mixing parameters in terms of diluent volume, mixing time length, mixing or not, shape of the blade.

SUMMARY OF THE INVENTION

In a first aspect of the invention, there is provided a beverage preparation device, said device comprising:
  a chamber for receiving and containing a liquid,
  said chamber comprising an opened top, an opened bottom and a lateral side wall,
  said chamber presenting the shape of a solid of revolution, the axis of revolution extending between the top and the bottom of the chamber,
  a rotation unit for spinning the chamber around its axis of revolution,
  and
  wherein the chamber presents a shape such that when the chamber is spinning, liquid present in the chamber forms a ring of liquid along the lateral side wall of the chamber above the bottom.

The beverage preparation device is configured for preparing a beverage by introduction of at least a liquid in a chamber and by agitation of the liquid in the chamber.

The preparation can consist in mixing a beverage component with the liquid in order to form a beverage liquid. This beverage component is preferably a soluble beverage ingredient (a soluble beverage powder or a beverage concentrate). The liquid is preferably water. The chamber enables the contact of the at least one beverage ingredient and the liquid and as a result a beverage is prepared.

The preparation can consist in agitating an existing beverage in the chamber in order to incorporate air in the beverage and as a result the beverage is frothed. For example milk can be introduced in the device to be frothed.

The beverage preparation device comprises an agitating chamber, said chamber comprising an opened top, an opened bottom and a lateral side wall extending in between. Accordingly the chamber is opened to atmosphere. The opened top enables the introduction of beverage components by gravity fall. Preferably it is sufficiently large to enable the introduction of powder ingredients therethrough.

The opened bottom enables the dispensing of prepared beverage by gravity fall. Usually the chamber is deprived of valve at its bottom.

The chamber presents the shape of a solid of revolution, the axis of revolution extending between the top and the bottom of the chamber.

The beverage preparation device comprises a rotating unit configured for spinning the chamber around its axis of revolution.

The shape of the chamber is defined such that when the chamber is spinning, liquid present in the chamber forms a ring of liquid along the lateral side wall of the chamber above the bottom.

Due to the spinning, centrifugal force exerts on the liquid that is present in the chamber. Liquid is thrown to the lateral wall of the chamber and spreads on the surface of the lateral wall above the opened bottom. The lateral wall is designed so that the liquid spinning with the chamber takes the shape of ring.

Accordingly, while the chamber is spinning, no liquid is dispensed through the bottom and the preparation of the beverage can be as long as desired, at least as long as necessary to get the attributes of the final beverage e.g. full dissolution or required frothing as will be explained further. Advantageously no dripping is observed during spinning though the chamber is opened at the bottom.

Besides the shape of the chamber enables the concentration of all the beverage component(s) in a particular area of the chamber, that is the volume of the ring. The concentration of liquid and beverage soluble ingredients in this volume increases contact between them and improves dissolution.

According to the preferred embodiment, the chamber presents a shape such that, in a vertical cross section of the chamber:
- the largest diameter of the chamber is between the top and the bottom of the chamber, and
- the diameter decreases from said largest diameter to the diameter at the top, and
- the diameter decreases from said largest diameter to the diameter at the bottom.

Preferably the chamber presents essentially the shape of a top.

Consequently, while the chamber is spinning, the spinning liquid remains around the area of the chamber presenting the highest diameter, and accordingly the interaction between liquid and the beverage ingredient(s) is improved.

Accordingly as long as the chamber spins, the liquid does not flow from the opened bottom. The mixing or agitating time is directly controlled by the time for spinning and it is possible to get a long time of mixing with a small volume of liquid until the required dissolution and beverage properties are reached.

Due to the decrease of diameter from the area of largest diameter to the bottom, the bottom part of the chamber presents an inclined slope enabling the dispensing of the beverage in direction to and through the opened bottom when the spinning of the chamber is stopped. There is no need to have and actuate a valve.

Due to the decrease of diameter from the area of largest diameter to the top, a ring of liquid forms along the lateral wall of the chamber.

Preferably the largest diameter extends along a portion of the lateral wall that is essentially parallel to the axis of revolution of the chamber. This portion can be straight or partially or fully rounded (like a doughnut shape).

Generally the chamber is designed so that the ratio of its internal largest diameter to its internal height is comprised between 1 and 5. With such designs, the spinning chamber is able to provide an increased tangential speed for the liquid in the portion with the largest diameter. Accordingly, when a static mixer is introduced in the spinning chamber, the difference of relative velocities between the mixer and the liquid—and respectively the shear stress applied on the liquid—are increased.

Generally the chamber presents a shape and the chamber is positioned inside the beverage preparation device so that the lower part of the lateral side wall—that is the part decreasing from said largest diameter to the diameter at the bottom in the above described configuration—presents a slope sufficient for enabling full evacuation of liquid, and optionally foam, when chamber stops spinning.

Preferably, once positioned in the beverage preparation device, the lower part of the lateral side wall of the chamber presents a slope of at least 5° with horizontal.

According to one first embodiment, the chamber can be positioned inside the beverage preparation device so that the axis of revolution (XX') extending between the top and the bottom of the chamber is oriented essentially vertically.

According to one second embodiment, the chamber can be positioned inside the beverage preparation device so that the axis of revolution (XX') extending between the top and the bottom of the chamber is inclined off the vertical.

The degree of inclination of the axis of revolution of the chamber can be variable and depends essentially on the design of the chamber. Generally this degree of inclination is indifferent as long as the lower part of the lateral side wall presents a slope sufficient for enabling full evacuation of liquid, and optionally foam, when chamber stops spinning, that is presents a slope of at least 5° with horizontal.

Generally the internal surface of the wall of the chamber is smooth and deprived of any embossed or raised design. Accordingly the liquid in the chamber spins with the chamber.

In a less preferred embodiment, the internal surface of the wall of the chamber can comprise raised designs, such as blades, for increasing agitation of the liquid within the chamber.

Preferably the chamber comprises a liquid deflector designed for diverting liquid introduced in the chamber through the opened top away from the opened bottom.

Accordingly this liquid deflector avoids that liquid passes directly from the top to the opened bottom of the chamber without being spun in the chamber.

According to one embodiment, the deflector can be present the shape of a cone centred above the opened bottom with the top oriented upwardly.

Preferably the liquid deflector is designed for diverting liquid falling through the opened top of the chamber to the lateral wall of the chamber. Accordingly when liquid is falling through the top and the chamber is spinning, liquid is diverted to the spinning lateral wall and is put in rotation therefrom.

Preferably the liquid deflector is designed for not retaining liquid sliding along the lateral wall of the chamber to the bottom. Accordingly when the chamber stops spinning, liquid falls to the opened bottom along the lateral wall without being retained by the deflector.

According to one embodiment, the deflector is designed for throwing liquid in direction of the upper part of the lateral wall of the chamber. Accordingly at the end of a beverage preparation, water can be thrown to the deflector while the chamber is slowly spinning and a curtain of water is able to rinse the lateral walls of the chamber. Such a rinsing is efficient since all the internal surface of the chamber can be rinsed without using an important amount of liquid.

Preferably the beverage preparation device comprises a liquid supply for supplying liquid in the chamber through the opened bottom of the chamber and said device is configured for orienting liquid offset from the opened bottom of the chamber.

Accordingly there is less risk that liquid passes directly through the top of the chamber to the opened bottom without being spun in the chamber.

According to one embodiment, the beverage preparation device comprises a static mixer, said static mixer being positioned in the internal volume of the chamber and being positioned relatively to the chamber so that it is crossed by liquid when liquid spins with the chamber.

Contrary to the chamber that is able to be spun, the static mixer is immobile. Accordingly, the rotation of the chamber creates a difference of speeds between the chamber and the mixer, and consequently between the liquid and the mixer.

The static mixer enables a better mixing of the components introduced in the chamber and optionally the frothing of the components. The mixing effect is obtained as soon as the liquid and the other beverage component(s) spin with the chamber. The frothing effect is obtained when the liquid spins at a sufficient speed.

Preferably the static mixer is designed and/or positioned in the mixing chamber so as to be partially inside the ring of spinning liquid and partially outside said ring. Due to this position the interface of spinning liquid with air is destabilized and air is introduced in liquid with a final frothing effect if the speed is sufficient. This speed varies with the nature of the components introduced in the chamber, the shape of the chamber, the shape of the static mixer. Generally the static mixer is sufficiently large so as to obtain this effect for whatever volume of liquid introduced in the chamber.

Preferably the static mixer is attached to a fixed part of the device and is retained immobile in the chamber by means of an arm extending through the opened bottom or the opened top. The arm is attached to a fixed part of the machine. Preferably the arm extends through the opened bottom.

Preferably the static mixer is removable from the machine. The static mixer can be attached to the machine by removable means like clips or magnets so that it can be easily manually removed or attached, preferably without the need of any tool.

When the static mixer is removed:
it is easy to properly clean it.
it is possible to prepare beverages without froth even if the chamber spins at a high speed.

It is also possible to design different static mixers depending on the volume of the beverage to be prepared, the desired size of the bubbles, the desired thickness of the foam and/or the nature of the beverage.

The chamber and the static mixer can be designed for beverages comprising big non soluble ingredients like croutons; in particular the bottom of the chamber can be large enough to enable the dispensing of these ingredients.

The static mixer can be present any shape enabling mixing and/or frothing. According to one embodiment it can be a spring.

Since it is the liquid which spins and it is the mixer which remains immobile, there is no need to have multiple mixers, e.g. multiple blades, or a mixer extending on a long portion of the chamber. The static mixer can be a small device. It is not expensive to produce. It remains easy to clean.

According to a particular embodiment, the static mixer can be configured for heating the liquid in the chamber. The static mixer can be supported by an arm, said arm being configured for transferring heat from a heater to the static mixer.

According to one mode, the heater can be positioned externally to the arm and the arm can comprise at least one heat conductive member to conduct heat from the heater through the arm to the static mixer.

According to another mode, the heater can be positioned inside the arm. Then the arm presents an electrical connection with an energy supply inside the beverage preparation device.

The heater can be a resistor or any other equivalent known heater.

In a less preferred embodiment where the internal surface of the wall of the chamber comprises raised designs, the combination of this raised designs with a static mixer strongly increases the agitation of the liquid that becomes sheared between the mixer and the designs.

Preferably the top of the chamber comprises a lip extending downwardly from the edge of the opened top. The lip extends from the opened top downwardly inside the internal volume of the chamber. This lip enables the design of a large opened top while avoiding that spinning liquid overflows through the top opening. When the chamber presents a rather small height (or a rather high ratio of its internal largest diameter to its internal height), depending on the volume of liquid introduced in the chamber, the thickness of the ring of liquid spinning in the chamber can become important and the lip avoids liquid overflow.

In the beverage preparation device the rotating unit for spinning the chamber around its axis of revolution can comprise a rotating motor cooperating with the chamber by mechanical means like at least gear(s) or a pulley, or electromagnetic induction means, or any other means for rotating a device directly or indirectly.

By indirectly it is meant that the spinning chamber is not directly driven into rotation by the rotation unit: the chamber can be hold by an intermediate device, this device being rotated by the rotation unit.

Preferably the chamber is hold by a support, said support being rotated by the rotation unit. The chamber can be simply put on the support without any fixing device. Accordingly the chamber is easily removable and dismountable from the support. In particular there is no need to guarantee any tightness through a seal. Maintenance and replacement is very easy. In particular, the operator can design the beverage preparation device like he/she wants.

Preferably the assembly of the chamber, the support and the rotation unit can be hold on a drawer so that the operator can draw the drawer and raise up the chamber from the support without hitting other elements of the device positioned above the chamber in its operation status.

According to one embodiment the beverage preparation device can comprise a heater for heating the liquid within the chamber. The heating can be applied to any surface in contact with the liquid such as the chamber, the static mixer or a heating member introduced through the opened top or the opened bottom of the chamber.

According to one variant the chamber can be made of a ferromagnetic material and the device can comprise a heat inductor for heating the chamber.

Alternatively the chamber can be heated by resistive heating, infra-red heating, micro-wave heating, ultrasonic heating or any other means for heating a chamber.

Depending on the nature of the beverage prepared in the chamber, the chamber can comprise a dispensing tube for dispensing the beverage and the tube comprises a device designed for breaking the spinning movement of the beverage during dispensing. This device is particularly used for a beverage with low density like coffee. This device can be a cross extending at least partially through the tube.

For other type of thicker beverages or for beverages comprising solid pieces like bread in soups, the presence of a dispensing tube may not be necessary. The chamber presents the advantage of allowing a large opening at the bottom (since the chamber keeps the beverage in the chamber as long as the chamber spins).

According to one embodiment, the beverage preparation device can comprise several chambers such as describe above.

According to one mode, the chambers can be identical. Consequently several beverages can be prepared simultaneously. Such a beverage preparation device is particularly helpful in the out-of-home area because the operator can serve several customers rapidly.

According to another mode, the chambers can differ by at least their internal shapes and/or their internal volumes and/or optionally by the presence of at least one static mixer. Consequently the beverage preparation device enable the preparation of various different beverages with chamber fully configured for each type of beverage. For example the beverage preparation device can comprise:

a chamber with a big internal volume and a static—and optionally heating—mixer for frothing milk, and a chamber with a smaller internal volume for preparing coffee.

Each chamber is specifically designed for the best preparation of foamed milk and of coffee and an operator can switch from one preparation to the other without replacing one chamber by another one inside the beverage preparation device.

Generally the beverage preparation device with several chambers comprises several rotating units, each of them being configured for spinning one dedicated chamber. Such a device presents the advantage of enabling sequential preparation of different beverages; these beverages can be further mixed together in the same drinking cup. Such a device presents also the advantage of enabling the precise control of speed and spinning time for each chamber; each beverage is prepared in optimal conditions.

According to a particular embodiment, the beverage preparation device comprises several chambers and one rotating unit for spinning said chambers simultaneously. The beverage preparation device is less expensive. Such an embodiment is useful when the device comprises identical chambers configured for preparing identical beverages simultaneously. Additionally such an embodiment is useful to shorten the preparation time of a final beverage made of two beverages like a cappuccino or a latte macchiato. Milk can be frothed while the coffee is prepared and both can be simultaneously dispensed in the drinking cup when the common rotating unit stops.

According to one embodiment, the beverage preparation device can comprise at least two chambers, one chamber being positioned above the other chamber so that the beverage prepared in the upper chamber is dispensed in the lower chamber. In such an embodiment the upper chamber can be dedicated to the simple reconstitution of a beverage from a soluble beverage powder and the lower chamber can be dedicated to the frothing of this reconstituted beverage with optionally another component. This second component can be introduced in the lower chamber from a component supply or manually or can even be a reconstituted beverage prepared in a second upper chamber.

According to a second aspect, there is provided a method for preparing a beverage with a beverage preparation device such as described above comprising the steps of:
  a) spinning the chamber, then
  b) introducing at least one beverage component including at least one liquid in the spinning chamber, then
  c) keeping spinning the chamber until the beverage is prepared, then
  d) stopping the spinning and enabling the dispensing of the beverage through the opened bottom of the chamber.

The method can comprise a last rinsing step wherein water is introduced in the chamber while the chamber is spinning.

Generally the beverage components are at least a beverage liquid and optionally a soluble beverage ingredient.

At least one beverage liquid is introduced as a beverage component. This liquid is preferably milk or water. Milk can be introduced alone whereas water is introduced as a diluent with at least one additional soluble beverage component.

Soluble beverage ingredients can be liquid concentrates, like coffee, tea or milk concentrates, or syrups. They can be introduced in addition to water or milk.

Soluble beverage ingredients can be powder concentrates, like instant soluble coffee, instant soluble tea, chocolate powders 3-in-1 powders, soup powder can be introduced in addition to water or milk.

The different components can be introduced simultaneously or separately. They must be introduced while the chamber is spinning otherwise they would flow directly through the opened bottom.

According to one embodiment, only milk is introduced in the chamber. The method enables the frothing of milk. In that method the chamber comprises a static mixer to froth milk. Preferably the milk is heated in the chamber while it is spun.

According to another embodiment, at least one liquid and at least one soluble beverage ingredient are introduced in the chamber so that the at least one soluble beverage ingredient dissolves in the liquid.

The method can also implement the subsequent preparation of beverage according to the two above embodiments. For example a cappuccino can be prepared by frothing milk according to the first embodiment, and then by preparing coffee from soluble coffee and water according to the second embodiment.

During beverage preparation, the speed of rotation of the chamber can depend at least on the size and shape of the chamber, the nature of the liquid introduced in the chamber, the properties desired for the final beverage, the heating, the shape of the static mixer.

For example the speed can vary between 60 rpm during rinsing step and 6000 rpm during frothing.

Usually the temperature of the beverage or liquid introduced in the chamber can be adjusted before their introduction in the chamber. Any known technics for heating can be implemented.

According to one embodiment, a first part of the final beverage is produced by implementing steps a) to d), and a second part of the final beverage is produced by implementing steps a) to d) again, and the rotational speed $\omega_1$ of the chamber during steps b) and c) for producing the first part of the final beverage differs from the rotational speed $\omega_2$ of the chamber during steps b) and c) for producing the second part of the final beverage, and one rotational speed $\omega_1$, or $\omega_2$ respectively, is set for enabling the production of froth and the other rotational speed $\omega_2$, or $\omega_1$ respectively, is set for avoiding the production of froth.

This embodiment is preferably implemented for preparing a coffee with crema. The first steps a) to d) enable the preparation of the crema, whereas the second steps a) to d) enable the preparation of black coffee, or alternatively the first steps a) to d) enable the preparation of black coffee, whereas the second steps a) to d) enable the preparation of the crema.

Preferably the volumes of the first part of the final beverage and of the second part of the final beverage are different, the volume of the part produced at the highest rotational speed being smallest than the volume of the other part. In case of preparation of coffee with crema, it means that the volume of the part with crema is smaller than the other volume of the part of black coffee.

Preferably the spinning times of the first part of the final beverage and of the second part of the final beverage are different, the spinning time of the part produced at the highest rotational speed being longer than the spinning time of the other part. In case of preparation of coffee with crema, it means that the spinning time of the part with crema is longer than the other spinning time of the part of black coffee.

The black coffee presents the advantage of evacuating any remaining bubbles produced previously from the chamber. The final rinsing step can be shortened.

It has also been observed that the in-cup aroma of the expresso coffee is improved compared to one prepared in one shot. Actually it has been observed that reducing shear stress and spinning time on the coffee provides a better in-cup aroma. Accordingly, in the implementation of steps a) to d) at lower speed and shortest spinning time, aromas are preserved.

According to one embodiment, the method is implemented with a beverage preparation device, said device comprising several chambers and one rotating unit for spinning said chambers simultaneously, and said device comprising two chambers, one of the chambers comprising a static mixer and the other chamber being deprived of static mixer, and this method comprises the steps of introducing the same beverage component, preferably soluble coffee, in both chambers.

Such a method is particularly adapted for the preparation of coffee with crema. Although the two chambers of the device are configured for spinning at the same rotational speed, one is deprived of static mixer. Accordingly, the chamber deprived of static mixer enables the preparation of black coffee under low shearing stress and the other chamber comprising a static mixer enables the preparation of crema under high shearing stress.

The method presents the advantage of preparing simultaneously both parts of the same beverage and dispensing the final beverage rapidly.

The beverage component can be introduced at different times in each one of the chambers.

Preferably the volume of the black coffee is greater than the volume of the crema.

In the present application the terms "internal", "bottom", "top", "upper", "lower", "upwardly" and "lateral" are used to describe the relational positioning of features of the invention. These terms should be understood to refer to the chamber(s) in its/their normal orientation when positioned in a beverage preparation dispenser for the production of a beverage as shown in FIG. 1 or 13.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures:

FIGS. 11a, 11b, 12a and 12b illustrate particular chamber comprising blades.

DETAILED DESCRIPTION OF THE DRAWINGS

Figure 1:
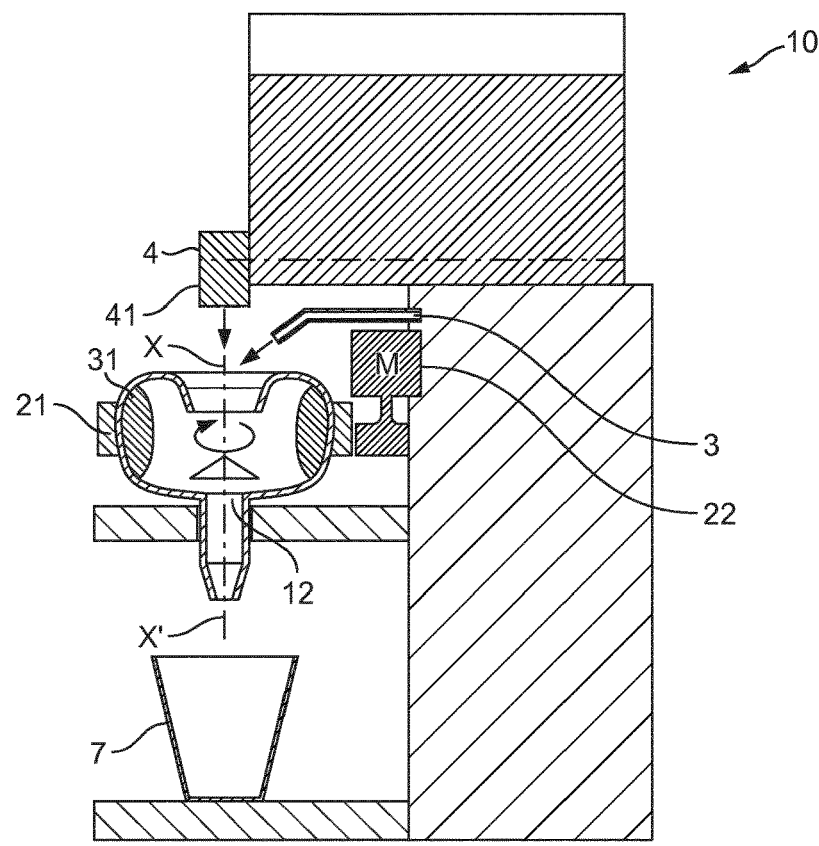
FIG. 1 is a schematic drawing of a beverage preparation device according to the invention.

FIG. 1 illustrates a device for preparing a beverage in a cup 7, usually positioned on a drip tray.

The device comprises a liquid supply 3. The liquid supply is generally linked to a fluid system provided in the device and supplying hot water. For that, the device generally comprises a water tank that can be replenished with fresh water. A water pump transports water from the tank to a water heater such as a thermoblock or a cartridge type heater and to eventually a non-return valve. The pump can be any type of pump such as a piston pump, diaphragm pump or a peristaltic pump. Hot water from the heater can dispensed through a simple nozzle or even a tube positioned abode the opened top of the chamber.

Alternatively, the liquid can be introduced by the operator within the chamber (for example fresh milk).

The device comprises a beverage component supply 4. In FIG. 1, the supply is illustrated as a tank of beverage soluble powder comprising a doser 41 at its outlet for dispensing a dose of component in the mixing chamber 1.

A controller (not illustrated) is further provided to initiate the spinning of the chamber, and the introduction of liquid and component in the chamber upon the user actuating or being prompted to press a command on the device.

The device comprises a chamber 1. The liquid supply is configured for supplying liquid to the chamber 1 in which said liquid is agitated. The device comprises a rotating unit for spinning the chamber along the axis XX' of the chamber. In the embodiment of FIG. 1, this axis XX' is oriented vertically. The rotating unit for spinning the chamber comprises a support 21 for holding the chamber and a motor 22 for driving the rotation of the support and the spinning of the chamber around its axis XX', that is oriented vertically.

Figure 2:
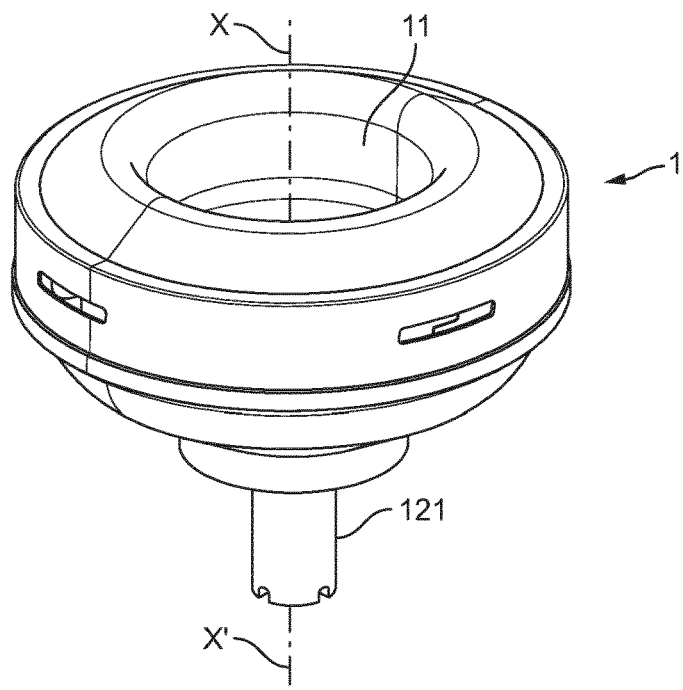
FIG. 2 illustrates a chamber of the beverage preparation device.

The chamber presents the shape of a solid of revolution, the axis of revolution XX' being oriented between the top and the bottom of the chamber. FIG. 2 illustrates a specific shape of such a solid of revolution.

The shape is designed so that when the chamber is spinning, liquid present in the chamber forms a ring of liquid along the lateral side wall of the chamber above the bottom 12 of the chamber. In FIG. 1 the chamber 1 is represented in vertical cross section to illustrate the position of the liquid 31 in the chamber during spinning.

In an alternative embodiment no liquid supply and no beverage component are present. The device comprises the chamber only. The consumer introduces the liquid he/she desires to froth in the chamber.

Figure 3:
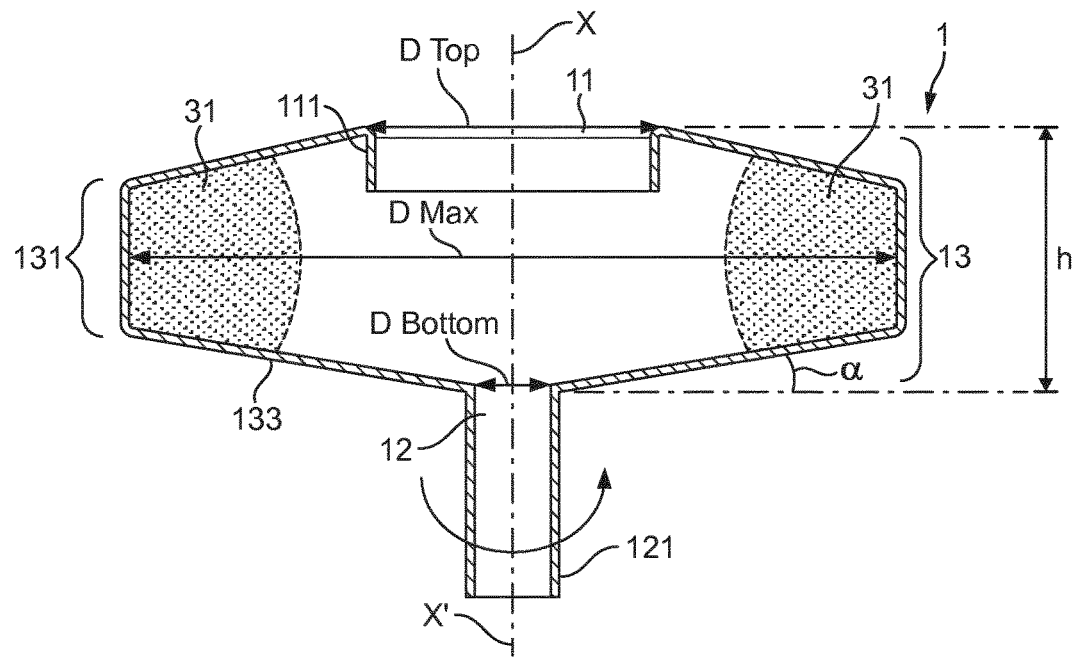
FIG. 3 is a vertical cross section of a schematic drawing of the chamber used in the beverage preparation device according to the invention.

FIG. 3 illustrates schematically the vertical cross section of a chamber 1 used in the device of the present invention. The chamber 1 presents the shape of a solid of revolution, the axis of revolution XX' being oriented between the top 11 and the bottom 12 of the chamber.

The top 11 of the chamber is opened. As the top 11 is opened liquid and eventually beverage component can easily fall therethrough as illustrated in FIG. 1. A lip 111 is attached to the top 12 to avoid splashing but is not mandatory. This lip makes possible the design of a large opened top: it enables the introduction of the arm of a static mixer as describes hereunder.

The bottom 12 of the chamber is opened. The chamber can comprise a tube 121 downstream the opened bottom 12 to guide the beverage to the cup but it is not mandatory.

A lateral wall 13 extends between the top and the bottom. Preferably the lateral wall 13 comprises at least a vertical portion 131. This vertical portion is not mandatory. The chamber can present the shape of a top or a doughnut for example.

As illustrated in the cross section, the largest diameter $D_{Max}$ of the chamber is between the top and the bottom of the chamber, preferably along the vertical portion 131

The diameter decreases from the largest diameter $D_{Max}$ to the diameter $D_{Top}$ at the top and the diameter decreases from the largest diameter $D_{Max}$ to the diameter $D_{Bottom}$ at the bottom.

With this design of the chamber, when the chamber is spinning, liquid present in the chamber is submitted to centrifugation force and becomes concentrated along the lateral wall presenting the largest diameter. As a consequence a ring of beverage 31 is created in the spinning chamber.

An important advantage of this chamber is that liquid remains in the chamber as long as the chamber spins. Accordingly it is possible to keep any volume of liquid in the chamber as long as desired. In particular it is possible to keep a small volume of liquid until it has been sufficiently agitated.

Accordingly there is no need for a valve downstream the bottom of the chamber and the device remains simple in manufacture and cost.

Preferably the chamber is designed so that the ratio of its internal largest diameter $D_{Max}$ to its internal height h is comprised between 1 and 5. With such designs, the spinning chamber is able to provide an increased tangential speed for the liquid in the portion with the largest diameter. Accordingly, when a static mixer is introduced in the spinning chamber, the difference of relative velocities between the mixer and the liquid—and respectively the shear stress applied on the liquid—are increased.

As illustrated the internal surface of the chamber is preferably smooth and deprived of any embossed or raised design. Consequently liquid present in the chamber spins at about the same speed as the chamber. According to one embodiment, it is possible to avoid agitation of liquid within the chamber it is possible to prepare flat beverages without bubbles and froth. In that case, the chamber simply enables contact between components.

The lower part 133 of the lateral side wall presents a slope sufficient for enabling full evacuation of liquid, and in particular of foam, when chamber stops spinning. If the chamber illustrated in FIG. 3 is positioned in the beverage preparation machine of FIG. 1 with the axis of revolution XX' vertically oriented, then preferably the angle α between the lower part 133 of the lateral side wall and horizontal is of at least 5°.

A dispensing tube 121 is attached to the opened bottom 12. The tube enables a proper dispensing of the beverage flowing from the opened bottom to the drinking cup.

Figure 4:
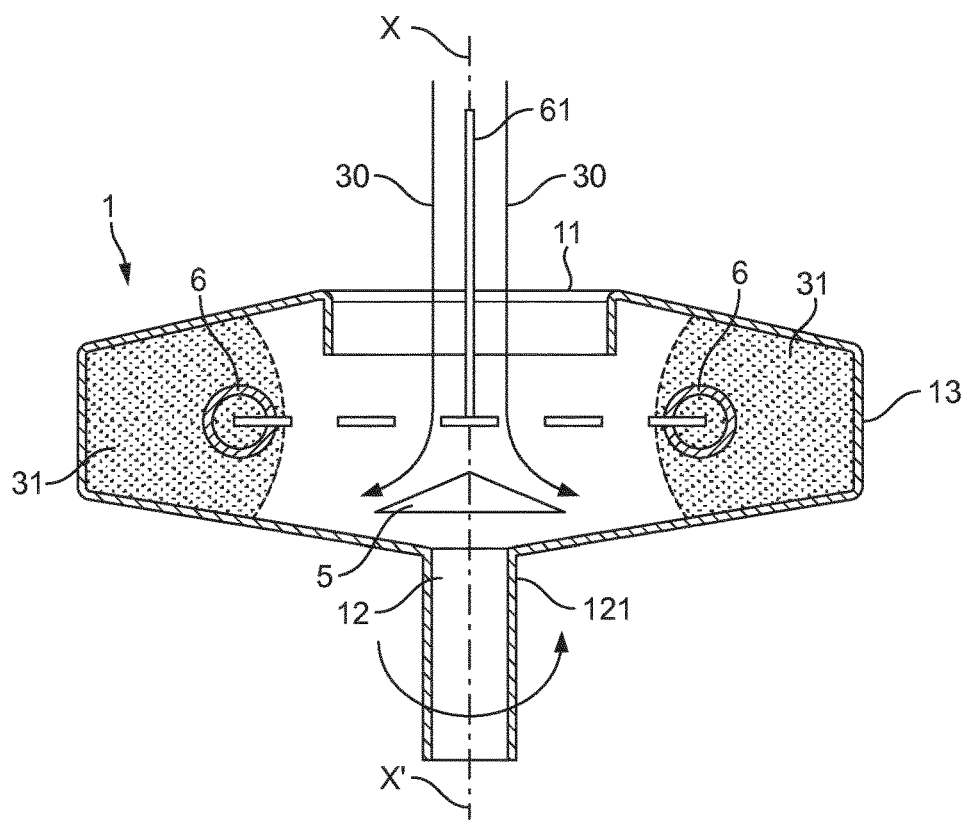
FIG. 4, 4a, 4b are variants of the chamber of FIG. 3.

FIG. 4 illustrates specific features of the chamber of FIG. 3.

First the chamber 1 can comprise a liquid deflector 5 designed for diverting liquid introduced in the chamber from the opened top 11 away from the opened bottom 12. Accordingly when the liquid is introduced while the chamber is spinning, the deflector diverts liquid in direction of the lateral wall 13 of the spinning chamber and said liquid becomes trapped by the centrifugal force; no liquid reaches the bottom and is dispensed.

In FIG. 4, the deflector 5 is a simple cone centred above the opened bottom 12 with the top of the cone oriented upwardly. The cone can be supported by a member extending through the tube 121 at the bottom. This member can be removed for cleaning. This member can be present a shape designed for stabilizing the beverage dispensed through the tubes 121 as explained later. Other designs can be implemented as illustrated hereunder. In FIG. 4 two arrows show the movement of liquid 30 falling from the top 11 of the chamber on the cone 5.

Figure 4A:
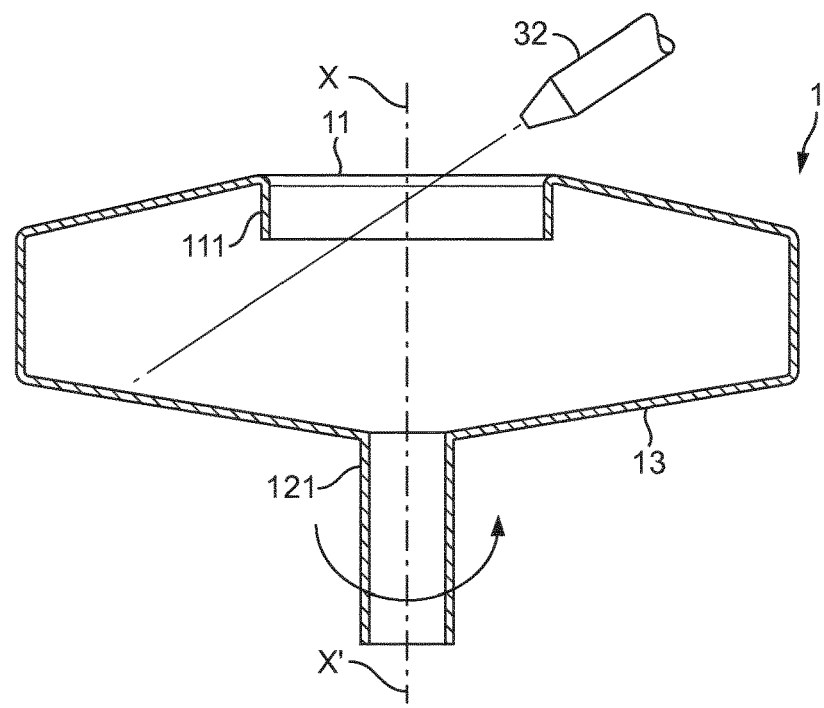
Figure 4B:
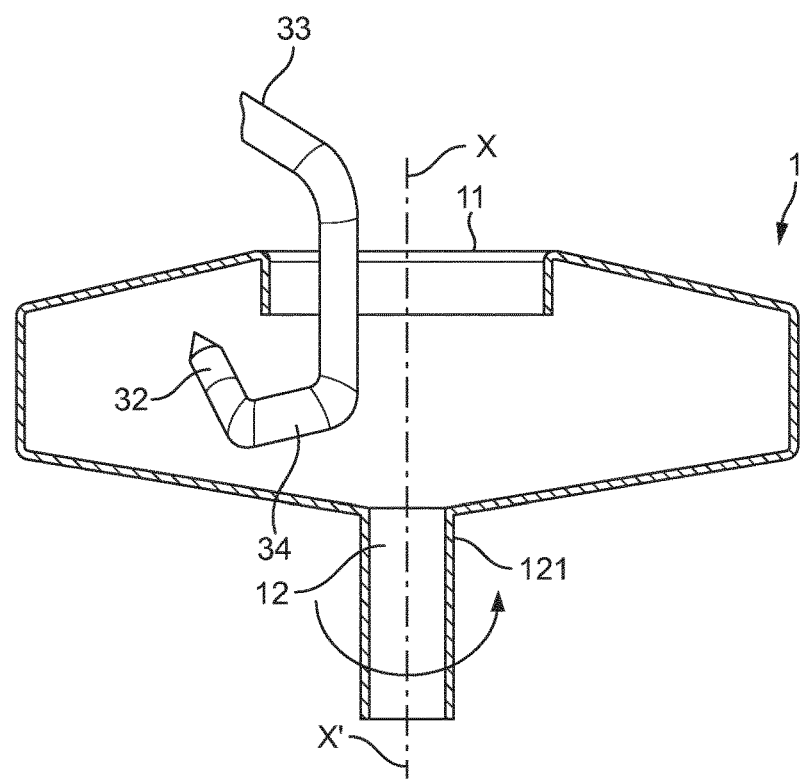

In an alternative embodiment, the chamber can be deprived of deflector but the liquid can be supplied in direction of the lateral wall of the chamber rather than in direction of the opened bottom. This liquid can be supplied by a liquid nozzle 32 oriented in direction of the lateral wall. The liquid nozzle can be fixedly oriented in direction of the lateral wall as illustrated in FIG. 4*a* or, in a specific variant illustrated in FIG. 4*b*, a flexible tube 33 attached to the liquid nozzle 32 can be supported by an articulated arm 34 enabling the introduction of the nozzle 32 through the opened top and then its orientation away from the opened bottom.

Secondly FIG. 4 illustrates how the chamber 1 can comprise at least one static mixer 6, here two mixers, positioned in the internal volume of the chamber. These static mixers are immobile and positioned inside the chamber so that they are crossed by the liquid 31 spinning with the chamber 1. Accordingly the liquid 31 passing through the static mixers 6 is frothed. These static mixers 6 are retained by an arm 61, the end of is attached to a fixed part of the device. The device can comprise one static mixer 6 only as illustrated here under. Preferably the static mixer(s) are removable for cleaning or for preparing beverage without frothed as illustrated in FIG. 3.

Different type of mixers can be used depending on the size of the mixing chamber, the nature of the beverage to be agitated and/or the beverage to be prepared and/or the volume of beverage. The static mixer can present any shape that destabilizes the flow of spinning liquid along the lateral wall of the spinning with the chamber. For example, the static mixer can present the shape of a spring or a wave. The spring is preferably positioned so that its longitudinal axis extends in a plane perpendicular to the axis XX' and the spring essentially follows the curve of the lateral wall 13. Similarly the wave preferably extends in a plane perpendicular to the axis XX' and the wave essentially follows the curve of the lateral wall 13.

Generally the chamber is designed so that it is able to receive a certain volume liquid, said volume of liquid being set between a minimum volume and a maximum volume, in order to guarantee that when the chamber is spinning, both minimum and maximum volumes of liquid present in the chamber forms a ring of liquid along the lateral side wall 13 of the chamber. The static mixer 6 is positioned in the chamber so that it is hit by the spinning ring of liquid. for both minimum and maximum volumes of spinning liquid.

Other factors influencing the design of the chamber can be:
- the nature of the beverage to be produced, in terms of viscosity (in particular for beverage produced from beverage components like starch)
- the nature of the components introduced inside (powder, concentrate, non-soluble pieces).

Figure 5:
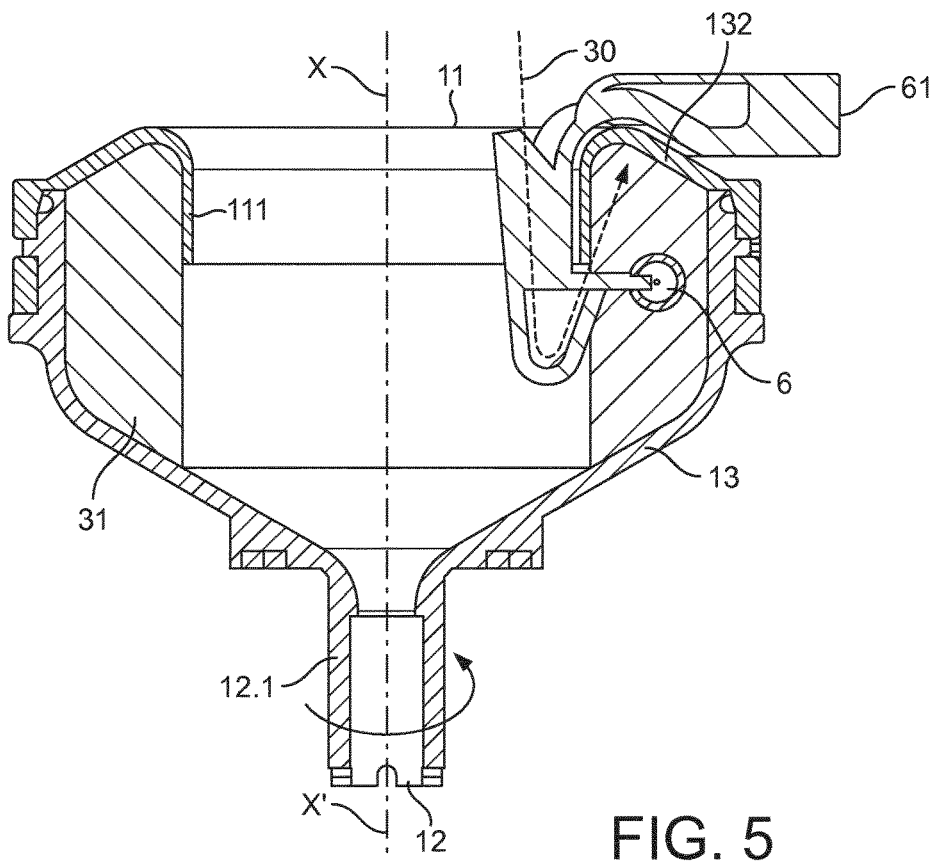
FIG. 5 is a vertical cross section of the chamber of FIG. 2 while spinning.

FIG. 5 is a vertical cross section of the chamber of FIG. 2 showing the ring of liquid 31 when the chamber is spinning. The liquid 31 is maintained along the lateral wall 13 of the chamber. Due to force of centrifugation, liquid is maintained along the lateral wall of largest diameter, that is to say along the portion 131. The lip 111 at the top avoids overflowing and splashing while keeping a large opened top.

A static mixer 6 is positioned within the ring of liquid and agitates liquid. Said agitation improves dissolution of beverage components and liquid introduced in the chamber. Said agitation can enable frothing by disturbing the ring of liquid and creating an interface liquid/air at which bubbles and froth can be generated.

In the illustrated embodiment, the static mixer 6 is a spring.

In this particular embodiment of FIG. 5, the arm 61 of the static mixer is designed as a liquid deflector too. Dotted line 30 illustrates the flow of liquid emerging from the liquid supply. The arm 61 of the static mixer is designed to receive the flow of liquid 30 falling from the opened top and to deflect this flow in direction of the lateral wall 131 of the chamber, preferably upwardly in direction of an upward part 132 of the lateral wall. This deflector avoids that liquid falls through the opened bottom when liquid starts flowing in the chamber. This deflector also enables the rinsing of the chamber from the top to the bottom after a beverage preparation.

Figure 6A:
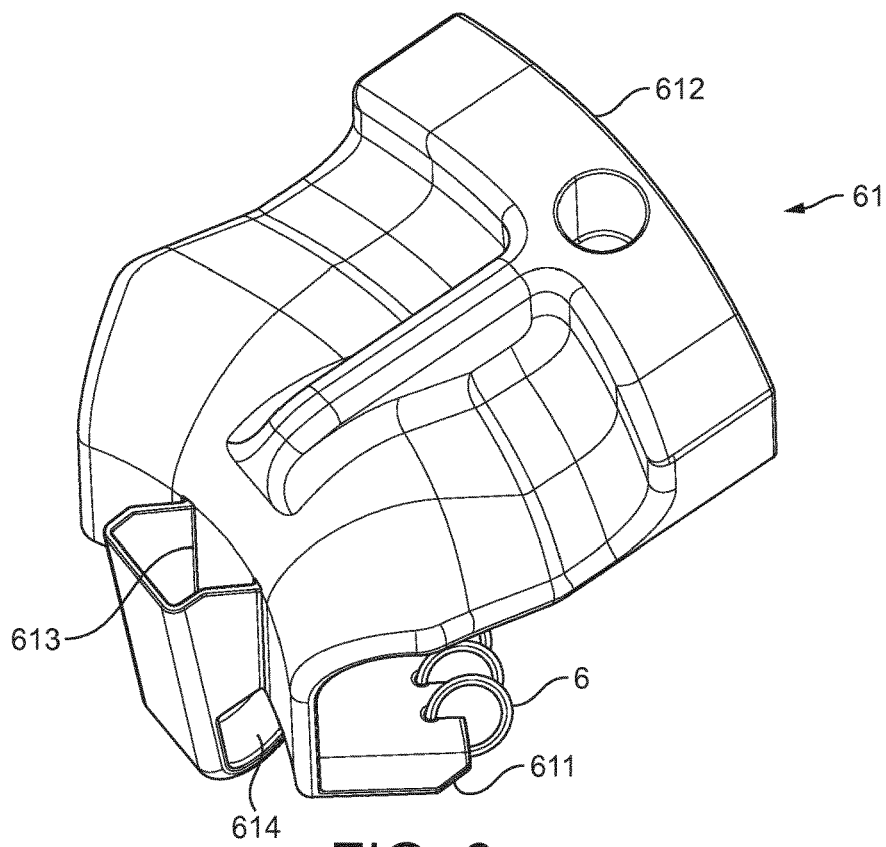
FIGS. 6a and 6b are perspective views of a static mixer arm.
Figure 6B:
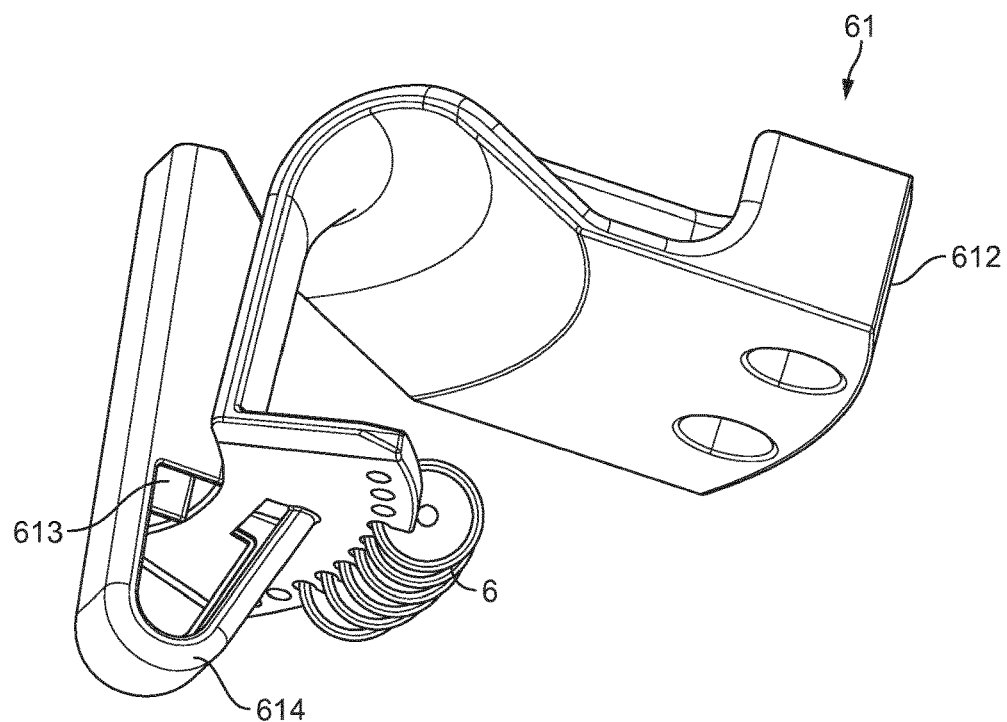

FIGS. 6*a* and 6*b* are isolated perspective views of the arm 61 of the static mixer providing the deflector function. One end 611 of the arm support the static mixer 6 that is a spring. The other end 612 is fixedly attached to the beverage preparation device—for example by means of the illustrated hole—so that the arm extends through the opened top of the chamber and positions the static mixer in the chamber near from the lateral wall 13. The arm comprises a chute 613 for receiving the flow of liquid and a guiding surface 614 at the bottom of the chute for directing the liquid upwardly.

This embodiment enables the combination of the deflector and static mixer support functions and limits clutter through the top.

Yet in another embodiment, the deflector may be separated from the arm of the static mixer. For example, when non frothing is desired.

This a specific embodiment the invention is not limited too.

Figure 7:
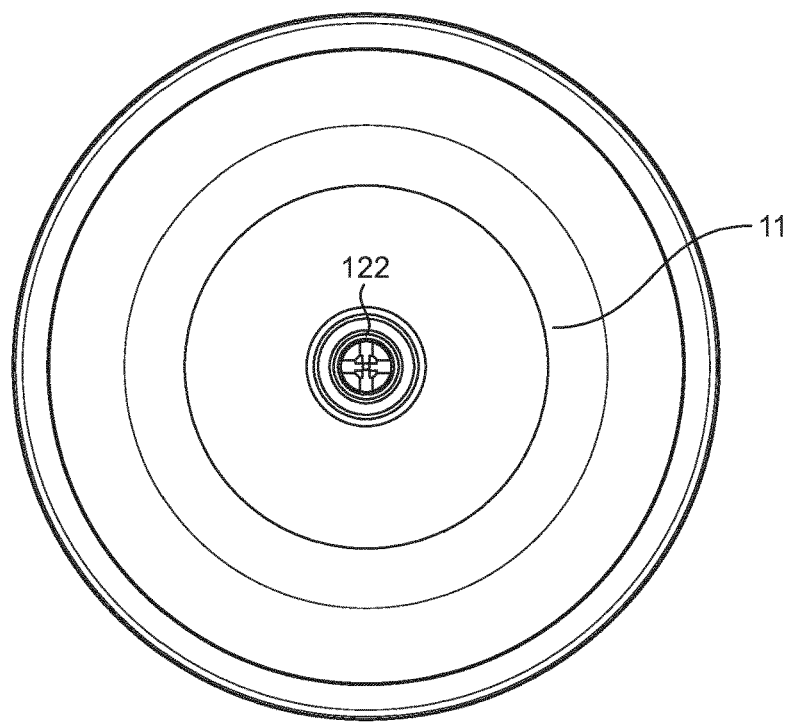
FIG. 7 is a top view a chamber.

FIG. 7 is a top view of a chamber such as illustrated in FIGS. 1 to 5. The dispensing tube attached to the opened bottom comprises a device 122 designed for breaking the spinning movement of the beverage during dispensing. This device is a cross 122 extending along the tube. This cross avoids that liquid goes on spinning within the opened bottom inducing a longer and dirty dispensing downstream. The cross produces a smooth and laminar flow and even enables filtering big bubbles.

In other variants, the opened bottom can comprise other devices for improving the properties of the dispensed beverage like limiting the generation of bubbles or sieving the size of bubbles of the beverage with plate comprising holes.

Figure 8:
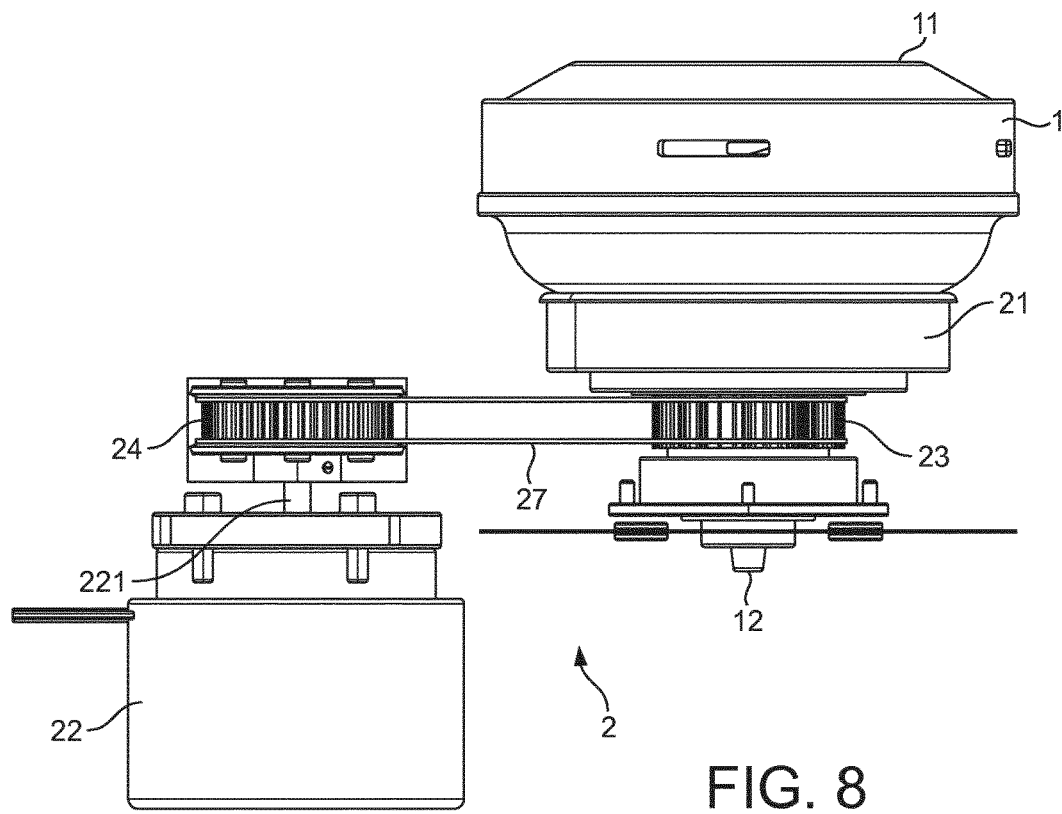
FIG. 8 illustrates the rotation of the chamber by gearing.

FIG. 8 illustrates the rotating unit of the beverage preparation device of FIG. 1. This rotating unit 2 comprises a motor 22 with an elongated rotating shaft 221 attached to a first gear 24 so that said gear can be rotated.

The chamber 1 is positioned in a rotating support 21 attached to a second gear 23 cooperating with the first gear 24 through a pulley 27.

Figure 9:
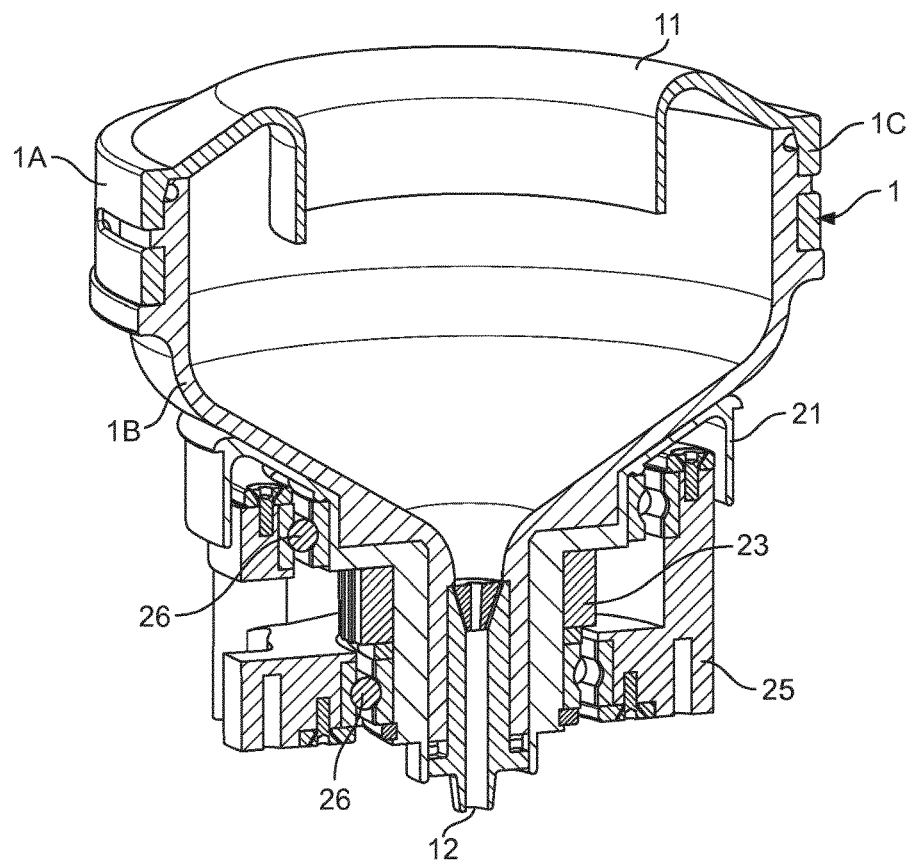
FIG. 9 is a cross section view of the chamber of FIG. 8.

As illustrated in FIG. 9, the chamber 1 simply rests on the support 21. The chamber 1 and the support 21 presents complementary external surfaces so that once the chamber 1 is positioned on the support 21 it is driven by the movement of the support. The chamber can be attached to the support with an interface shape that avoids slippage between the chamber and the support during rotation. The chamber 1 can be attached to the support 21 by a mechanical lock too or the chamber 1 can be attached to the support 21 by magnets.

The support 12 is fixedly attached to the second gear 23 so that the rotation of the motor 22 induces the rotation of the support 21. The chamber support 21 is standing on a fixed holder 25 through ball bearings 26.

When the operator wants to remove the chamber from the device, he simply needs to remove the chamber from the support 21 without any other dismantling operation inside the device. It is an important advantage compared to chambers comprising a whipper actuated by a motor.

Preferably the chamber is the assembly of two parts, these parts being manually easily dismountable. Preferably the chamber is the assembly of an upper part 1A and a bottom part 1B. The two parts can be assembled by means of cooperating bumps and holes on their external surfaces. Alternatively the two parts can be clipped together and when separated remained attached through ha hinge. Accordingly the operator can dismount the two parts and wash the internal surfaces.

Preferably the internal surface of the chamber is deprived of any raised design such as blades. Accordingly liquid and other beverage components do not remain blocked in the chamber. Rinsing at the end of the beverage preparation drags them through the opened bottom. During cleaning operation, the smooth internal surface of the chamber can be rapidly wiped.

Additionally the device does not need a valve at the outlet of the chamber for keeping liquid in the chamber during mixing. Due to centrifugation and the design of the chamber, liquid is kept inside as long as the chamber rotates. Accordingly there is no need to dismantle the chamber from a valve.

Figure 10:
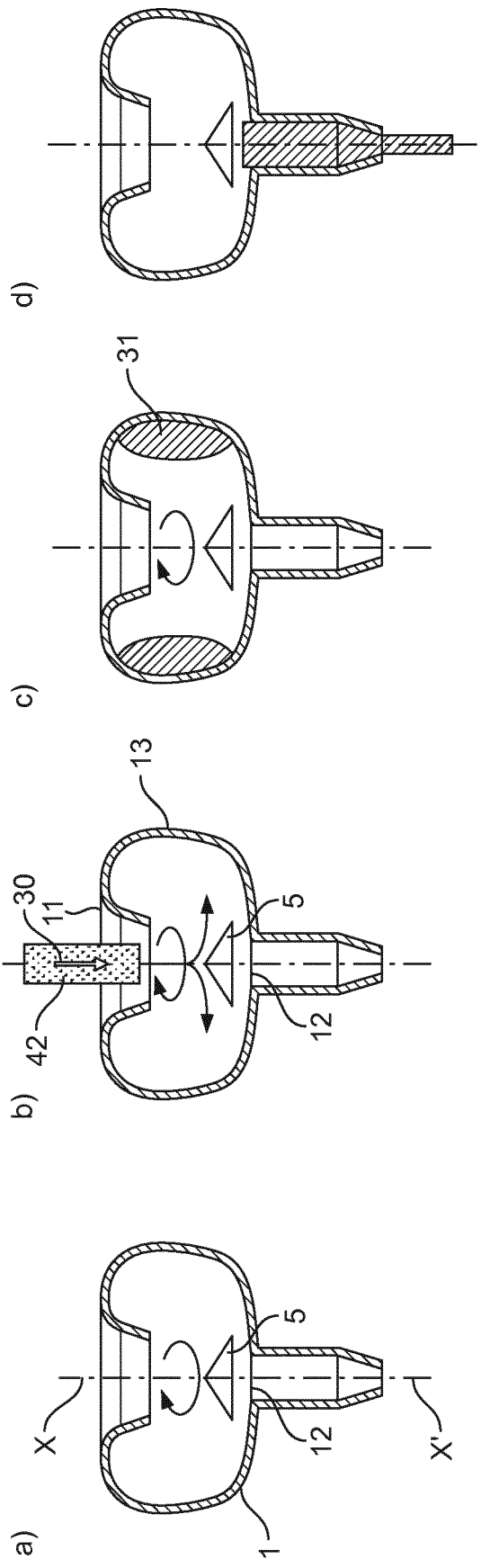
FIG. 10 illustrates the method for preparing a beverage with the beverage preparation device according to the invention.

FIG. 10 illustrates the method for preparing a beverage with the beverage preparation device according to the invention.

In a first step a), the spinning of the chamber 1 along its vertical axis XX' is actuated.

In a further step b), a liquid 30 and optionally beverage component(s) 41 are introduced through the opened top 11 of the chamber while it is spinning. They fall on a deflector 5 that diverts them on the spinning lateral wall 13 of the chamber. Liquid and component(s) can be introduced simultaneously or subsequently.

As long as the chamber spins the liquid and the beverage component(s) spin with the chamber and remain along the lateral wall 13 as illustrated in c).

In a further step d), spinning is stopped and the beverage flows through the opened bottom 12 of the chamber.

The method can comprise a last rinsing step (not illustrated) wherein water is introduced in the chamber while the chamber spins. Spinning can be implemented a low speed so that water can flows as a curtain along the internal surface of the chamber.

FIG. 10 illustrates the introduction of a liquid and powdered beverage ingredient. The invention covers also the method wherein a liquid only is introduced in the chamber.

The method enables the preparation of beverage with froth or crema when a static mixer is positioned in the chamber. The speed of rotation can be adapted depending on the shape of the static mixer and its capacity to agitate the liquid. For example if the static mixer has a shape that is poorly shearing the interface between liquid and air, then rotational speed must be higher to compensate and create the desired shear stress level. On the contrary, if the static mixer is designed so that it strongly disturbs the interface between liquid and air, then an equivalent level of shear stress can be reached at a lower rotational speed.

The method enables the preparation of beverage without froth when the combination of the rotational speed and the static mixer shape generates a shear stress that is below the frothing level. Accordingly it is possible to prepare a beverage without froth even if a static mixer is present.

The method enables the preparation of beverage without froth too when no static mixer is positioned in the chamber.

A coffee was produced using the machine described in FIG. 1 with the chamber described in FIG. 5 and the embodiments described in FIGS. 8 and 9.

The chamber presented:
- a largest diameter $D_{Max}$ of 80 mm,
- a diameter at the top $D_{Top}$ of 40 mm, and
- a diameter at the bottom $D_{Bottom}$ of 8 mm,
- an internal height h of 50 mm.

During the coffee preparation the chamber was rotated at 4000 rpm. Then 2 g of soluble coffee and 50 ml of water were introduced. The chamber was kept on spinning during 10 s and no liquid dropped from the opened outlet during the rotation. After 10 s, rotation was stopped and coffee flew through the opened bottom.

FIGS. 11a and 11b are schematic drawings of a vertical cross-section and a horizontal cross-section of a chamber that can be implemented in a device according to FIG. 1, said chamber comprising blades 14 raising from its internal surface. The chamber comprises eight blades 14 equally positioned around the internal circumference of the chamber. These blades 14 are preferably positions near the portion of the lateral wall presenting the highest diameter $D_{Max}$, that is to say in the area where the liquid forms a ring when the chamber is spinning.

The chamber comprises eight static mixers 6, each formed of a blade extending radially from the centre of the chamber in direction of the lateral wall and preferably in direction of the blades 14. All the static mixers 6 are attached to a common arm 61.

FIGS. 12a and 12b illustrate a variant of the chamber of FIGS. 11a, 11b wherein the chamber 1 comprises blades 14 raising from its internal surface. The chamber comprises two rings of eight blades 14 equally positioned around the internal circumference of the chamber. The two rings are separated by a certain space d. The chamber comprises eight static mixers 6, each formed of a blade extending radially from the centre of the chamber in direction of the lateral wall and preferably in direction of the blades 14. All the static mixers 6 are attached to a common arm 61. The eight static blades are positioned in the space d between the two rings 14 of blades of the chamber.

Various other form of blades in the internal chamber and for the static mixer can be designed.

These embodiments illustrated in FIGS. 11a, 11b, 12a and 12b provide a very efficient shearing of the liquid during the rotation of the chamber. Yet their cleaning is more difficult.

Figure 13:
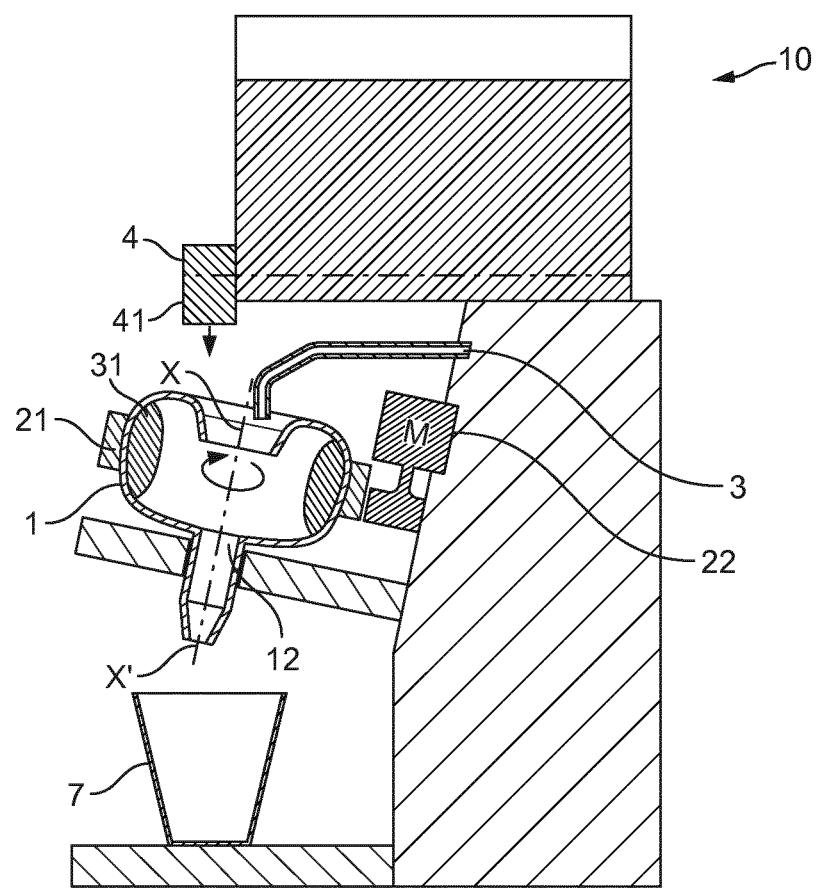
FIG. 13 illustrates a beverage preparation device comprising a chamber inclined off the vertical.

FIG. 13 illustrates an alternative to the device of FIG. 1 wherein the chamber 1 is positioned in the beverage preparation device so that the axis of revolution XX' of the chamber is inclined off the vertical.

Figure 14:
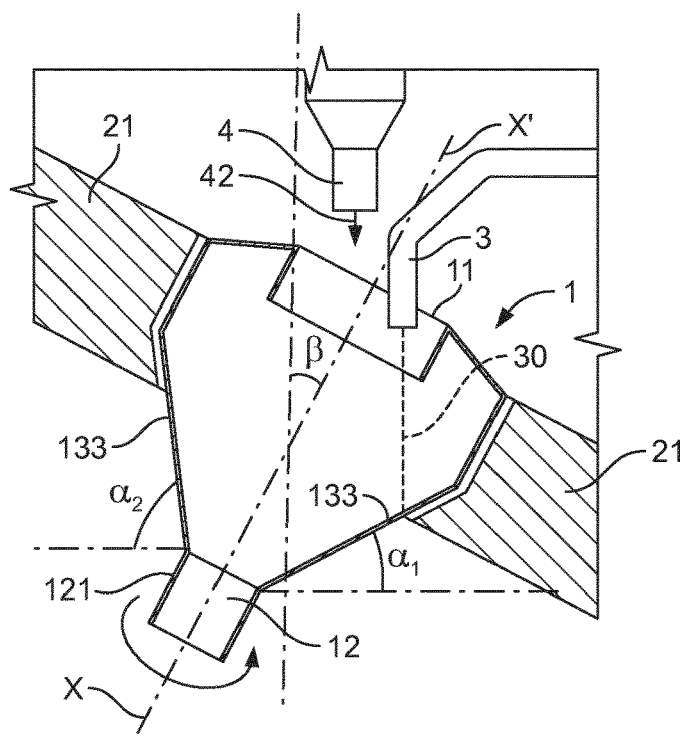
FIG. 14 is a vertical cross section of a schematic drawing of the chamber used in the beverage preparation device of FIG. 13.

FIG. 14 is a schematic illustration of the chamber 1 and the support 21 for the chamber isolated from the device of FIG. 13. The support 21 orientates the chamber 1 in the beverage preparation device so that its axis of revolution XX' is disposed at an angle relative to the vertical by an angle β. The chamber is designed so that, in this specific orientation inside the beverage preparation machine, the lower part 133 of the lateral wall of the chamber presents an angle α sufficient to enable full evacuation of liquid, and optionally foam, when chamber stops spinning. Due to the inclination of the chamber, this angle varies along the circumference of the chamber ($α_1$, $α_2$) but is always kept in general above 5°.

This orientation of the chamber 1 in the beverage preparation device presents the advantage of enabling the direct orientation of the flow of diluent 30 falling from the liquid supply outlet away from the opened bottom 12. Accordingly no deflector or articulated arm above the opened bottom is necessary. The same advantage exists for components 41 falling through the opened top 11.

Figure 15:
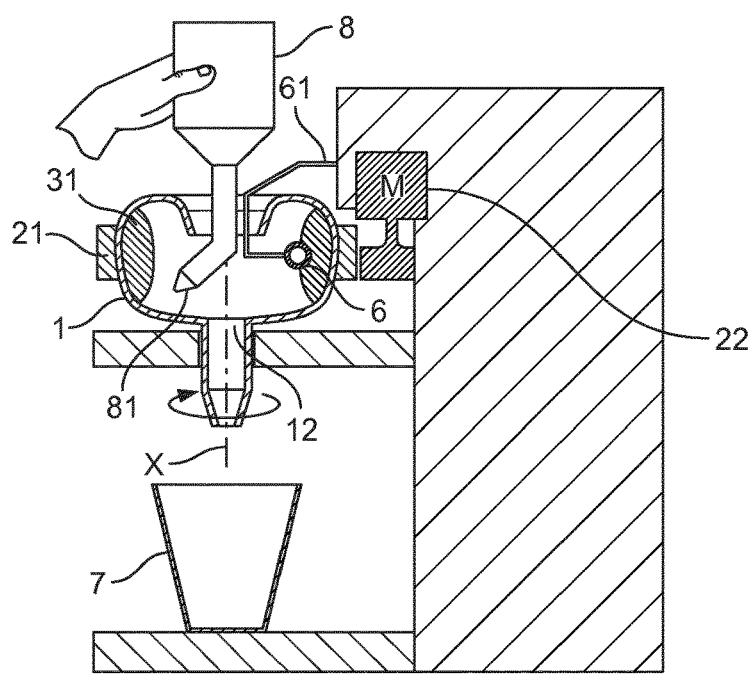
FIG. 15 illustrates the preparation of a beverage with manual introduction of liquid.

FIG. 15 illustrates a beverage preparation device according to the invention wherein liquid is introduced manually inside the spinning chamber. The device does not comprise any liquid supply nor any beverage component supply. The operator introduces the liquid to be agitated and usually frothed by means of a liquid container 8. Preferably the liquid container 8 comprises a liquid outlet 81 designed for orientating the liquid in direction of the lateral wall of the chamber. For example, said liquid outlet can present an elbow part that can be easily inserted through the opened top of the chamber.

Such a device is particularly adapted for frothing milk. Accordingly, preferably, the device comprises at least one static mixer to froth the liquid. Preferably the device comprises a heater for heating the liquid within the chamber 1 as described above.

Figure 16:
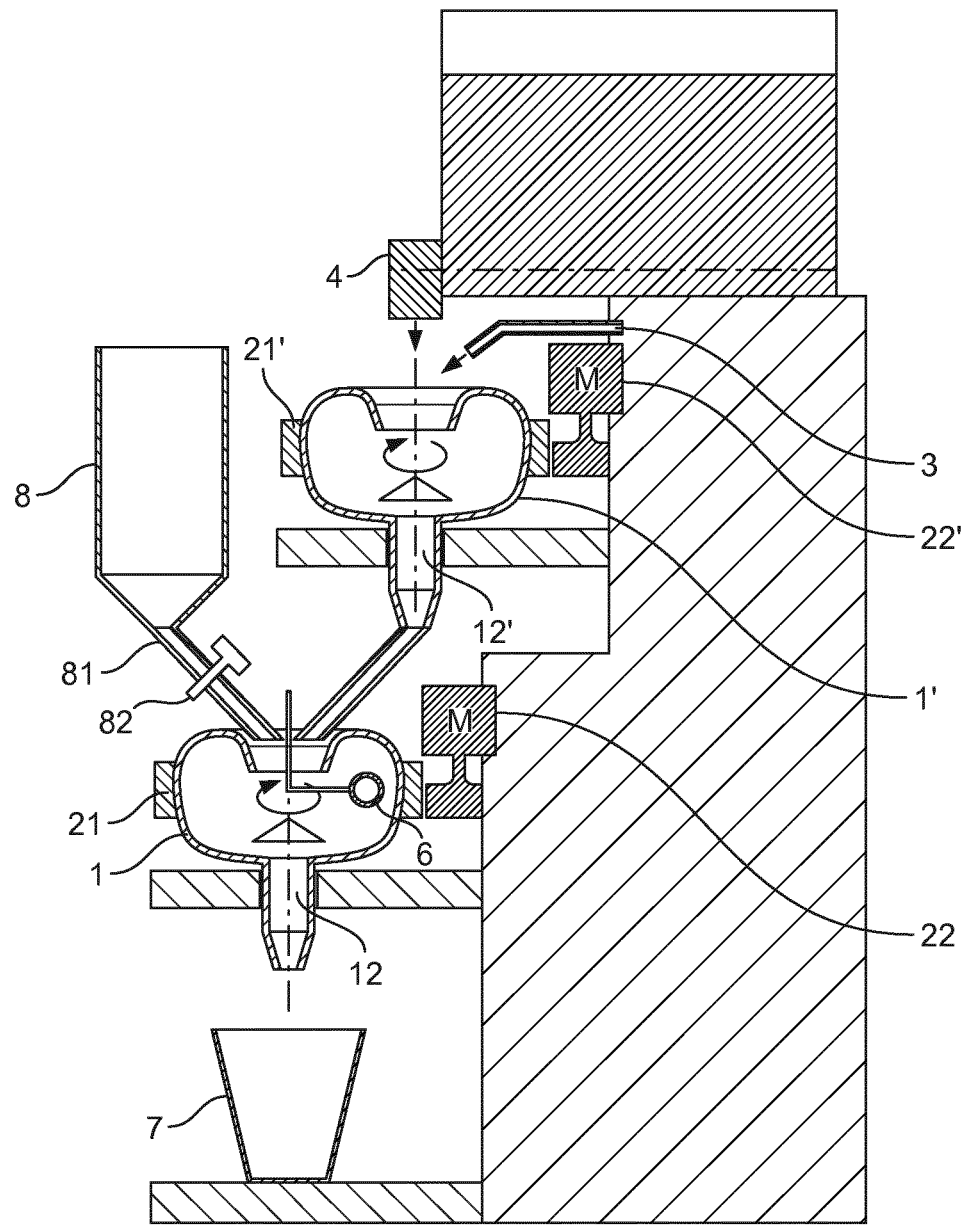
FIG. 16 illustrates a beverage preparation device comprising two chambers.

FIG. 16 illustrates a beverage preparation device according to the invention comprising two chambers 1, 1' positioned one above the other.

The upper chamber 1' is configured for preparing a beverage by reconstitution of a beverage component from a supply 4 with a liquid from a liquid supply 3. The reconstituted beverage is dispensed through the bottom 12' of the upper chamber to the lower chamber 1. This dispensing operation happens while the lower chamber 1 is spinning. The lower chamber is able to froth the beverage flowing from the upper chamber 1'. Optionally another beverage, for example stored in a liquid container 8, can be introduced with the reconstituted beverage in the spinning lower chamber 1. A valve 82 can be operated to enable introduction of the liquid while the chamber is spinning.

While FIG. 16 illustrates a specific embodiment of the beverage preparation device with upper and lower chambers 1, 1' and a liquid container 8, the invention is not limited to such an embodiment. In particular the liquid container can be replaced by:
  a second upper spinning chamber, or
  by a beverage component supply and optionally a diluent supply.

The beverage preparation device can also be devoid of any additional sources of beverage components in the lower chamber 1, said chamber being dedicated to frothing the beverage dispensed form the upper chamber 1' only.

Figure 17:
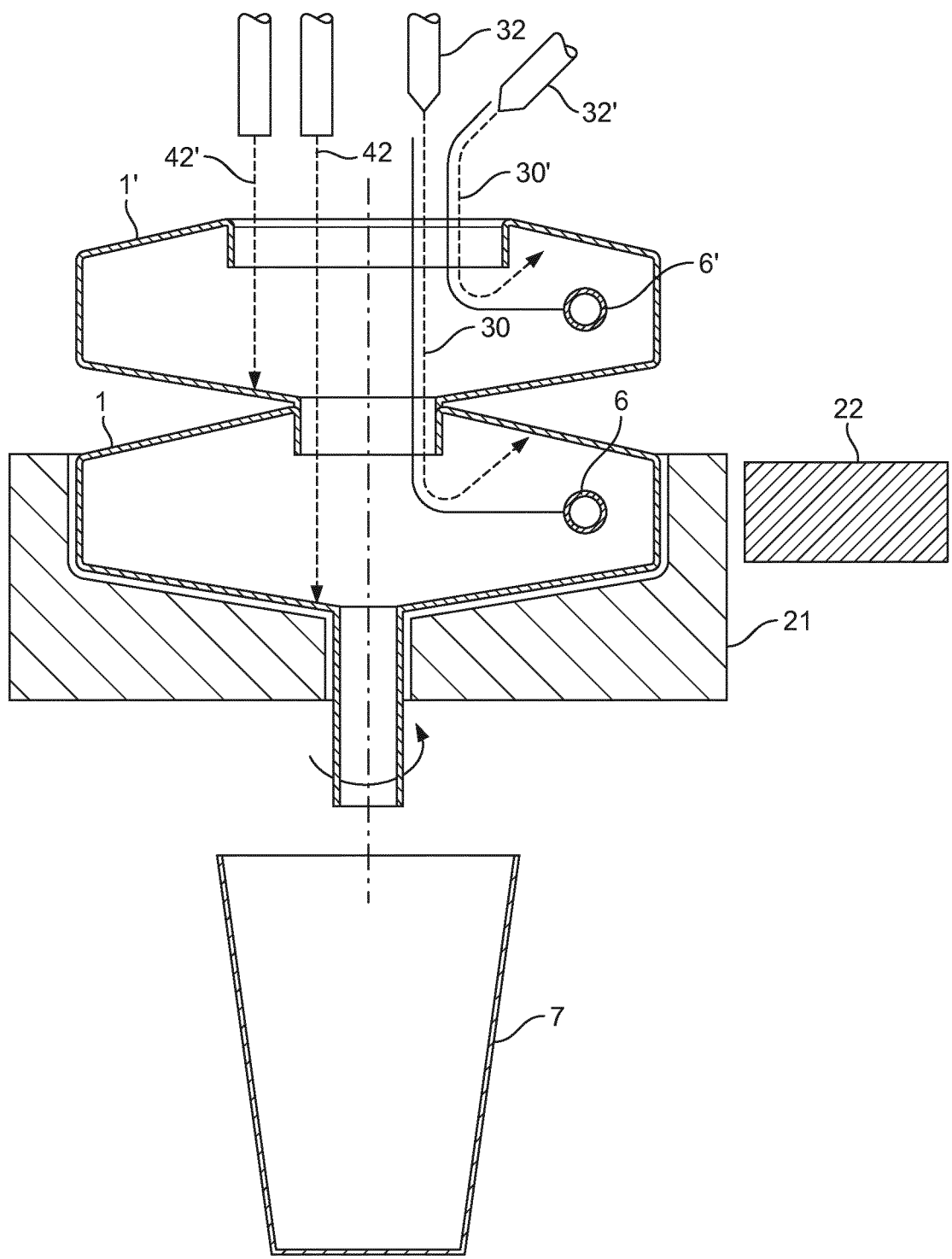

FIG. 17 illustrates a beverage preparation device according to the invention comprising:
  two chambers 1, 1' positioned one above the other and presenting the axis of revolution XX', and
  one rotating unit 2 for spinning said chambers 1, 1' simultaneously.

The chambers 1, 1' are attached one to the other or form one single piece of material so that the spinning of one chamber—chamber 1 in the illustrated embodiment—by one motor 22 makes the other chamber 1' spins too at the same speed and in the same direction.

Each chamber 1, 1' is associated with a static mixer 6, 6' respectively. The arm of each static mixer 6, 6' is designed as a liquid deflector too based on the principle illustrated in above FIG. 5. Dotted lines 30, 30' illustrate two flows of liquid emerging from two distinct nozzles 32, 32' and connected to a liquid supply, preferably the same for both nozzles. For each static mixer 6, 6', the arm receives the flow of liquid 30, 30' and deflects this flow in direction of the lateral wall of the corresponding chamber 1, 1' respectively, preferably upwardly in direction of an upward part 132 of the lateral wall. According to alternative embodiments both or at least one of the chamber can be deprived of static mixer and the liquid can be introduced by means of a nozzle or tube and eventually a deflector.

The beverage preparation device comprises at least one beverage component supply for dispensing doses of beverage component 42, 42' in each chamber 1, 1'. In the illustrated embodiment, the chambers are designed so that the diameters at the top and at the bottom of each chamber enables the feeding of each chamber by simple gravity fall: the diameter of the lower chamber at the lowest point of said chamber is smaller than the diameter of the lower chamber at the highest point of said chamber and the diameter of the upper chamber at the lowest point of said chamber. Accordingly by positioning the beverage component dispensing outlets at different distances from the axis XX', it is possible to deliver beverage component either in the upper or in the lower chamber. The beverage components 42, 42' can be the same or of different natures.

The beverage components 42, 42' can be introduced at different times of the spinning process in their corresponding chamber. Accordingly it is possible to control the time of dissolution and the time of frothing of each component.

Such a device enables the preparation of a beverage by dissolving the same beverage component in both chambers 1, 1' simultaneously but under different conditions, in particular by mixing with a static mixer in one chamber and mixing without a static mixer in the other chamber. This embodiment enables the preparation of a part of the beverage without froth and a part of the same beverage with froth. This embodiment is particularly useful for preparing a coffee with crema, wherein the more important volume of black coffee is prepared in a gentle way in the chamber deprived of static mixer whereas the small volume of crema is prepared in the chamber comprising a static mixer. Accordingly the final beverage comprises the aroma of the coffee that has been gently dissolved and the nice aspect of the crema that has been energetically frothed. Both results have been obtained by spinning both chambers simultaneously at the same speed and for the same length of time. Optionally the soluble coffee introduced in the chamber deprived of static mixer can be introduced later than the soluble coffee introduced in the chamber with a static mixer and its final aroma can be even improved.

If desired, such a device enables the simplest preparation of a beverage in only one chamber when a liquid and a beverage component are supplied to one same chamber 1 or 1', preferably to the lower chamber, and nothing is introduced in the other chamber. Consequently, the device can be alternatively used for preparing simple beverages or complex beverages.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS chamber 1, 1'
  top 11 lip 111
bottom 12, 12'
  tube 121
  cross 122
lateral wall 13
  vertical portion 131
  upper part 132
  lower part 133
blade 14
rotating unit 2
  chamber support 21, 21'
  motor 22, 22'
  gears 23, 24
  holder 25
  ball bearings 26
  pulley 27
liquid supply 3
  flow of liquid 30, 30'
  spinning liquid ring 31
  nozzle 32, 32'
  flexible tube 33
  articulated arm 34
beverage component supply 4
  doser 41
  beverage component 42, 42'
liquid deflector 5
static mixer 6, 6'
  arm 61
  ends 611, 612
  chute 613
  guiding surface 614
cup 7
liquid container 8
  outlet 81
  valve 82
beverage preparation device 10

The invention claimed is:

1. A method for preparing a beverage with a beverage preparation device comprising a chamber for receiving and containing a liquid; the beverage preparation device further comprising a rotating unit for spinning the chamber around an axis of revolution; the method comprising:
   a) spinning the chamber, wherein the chamber comprises a top including a top opening, a bottom including a bottom opening, and a lateral side wall, wherein the top opening and the bottom opening are directly opposite each other, and wherein the chamber is shaped symmetrical to the axis of revolution extending between the top and the bottom;
   b) introducing at least one beverage component of the beverage, the at least one beverage component including the liquid, in the chamber during the spinning of the chamber such that the liquid present in the chamber forms a ring of the liquid along the lateral side wall of the chamber above the bottom opening;
   c) keeping the spinning of the chamber until the beverage is prepared; and
   d) stopping the spinning and enabling dispensing of the beverage through the bottom opening of the chamber.

2. The method according to claim 1 comprising a rinsing step wherein water is introduced in the chamber while the chamber is spinning.

3. The method according to claim 1, wherein:
   the beverage comprises a first part and a second part;
   the first part of the beverage is produced by implementing steps a) to d), and wherein the second part of the beverage is produced by implementing steps a) to d) again;
   wherein a first rotational speed of the chamber during steps b) and c) for producing the first part of the beverage differs from a second rotational speed of the chamber during steps b) and c) for producing the second part of the beverage, and
   wherein the first and second rotational speeds have a configuration selected from the group consisting of (i) the first rotational speed is set for enabling production of froth, and the second rotational speed is set for avoiding production of froth; and (ii) the second rotational speed is set for enabling production of froth, and the first rotational speed is set for avoiding production of froth.

4. The method according to claim 1, wherein the chamber has a diameter, and in a vertical cross section of the chamber:
   the diameter is largest at a point between the top and the bottom of the chamber;
   the diameter decreases as the chamber extends from the point to the top of the chamber; and
   the diameter decreases as the chamber extends from the point to the bottom of the chamber; and
   wherein step b) comprises introducing the at least one beverage component of the beverage in the chamber during the spinning of the chamber such that the liquid present in the chamber forms the ring of the liquid in the chamber at the point where the diameter is largest.

5. The method according to claim 1, wherein the chamber is positioned inside the beverage preparation device so that a lower part of the lateral side wall has a slope of at least 5° relative to horizontal, and the dispensing of the beverage comprises directing the beverage along the lower part of the lateral side wall and through the bottom opening of the chamber.

6. The method according to claim 1, wherein the chamber is positioned inside the beverage preparation device so that the axis of revolution extending between the top and the bottom of the chamber is oriented vertically, and step a) comprises spinning the chamber around the axis of rotation oriented vertically.

7. The method according to claim 1, wherein the chamber is positioned inside the beverage preparation device so that the axis of revolution extending between the top and the bottom of the chamber is inclined off the vertical, and step a) comprises spinning the chamber around the axis of rotation being inclined off the vertical.

8. The method according to claim 1, comprising diverting the liquid introduced in the chamber through the top opening away from the bottom opening using a deflector.

9. The method according to claim 8, wherein the diverting of the liquid by the deflector comprises directing the liquid toward an upper part of the lateral side wall of the chamber.

10. The method according to claim 1, comprising supplying the liquid from a supply in the beverage preparation device through the top opening of the chamber into the chamber; and orienting the liquid in a position offset from the bottom opening of the chamber.

11. The method according to claim 1, wherein the beverage preparation device comprises a static mixer, the static mixer being positioned in an internal volume of the chamber such that the static mixer is crossed by the liquid when the liquid spins with the chamber, and step a) comprises spinning the chamber while the static mixer remains immobile.

12. The method according to claim 1, wherein the spinning of the chamber is performed by a rotating motor cooperating with the chamber by at least one of a mechanical connection or an electromagnetic induction.

13. The method according to claim 1, wherein the spinning of the chamber comprises rotating a support holding the chamber.

14. The method according to claim 1, wherein the chamber comprises a lip extending downwardly from an edge of the top opening.

15. The method according to claim 1, wherein the spinning of the chamber begins before the introducing of the at least one beverage component.

16. The method according to claim 1, wherein the stopping of the spinning is performed before the dispensing of the beverage through the bottom opening of the chamber.

* * * * *